United States Patent
Lepak et al.

(10) Patent No.: US 9,355,034 B2
(45) Date of Patent: May 31, 2016

(54) REMOVAL AND OPTIMIZATION OF COHERENCE ACKNOWLEDGEMENT RESPONSES IN AN INTERCONNECT

(71) Applicant: Samsung Electronics Co., Ltd., Suwon-si, Gyeonggi-do (KR)

(72) Inventors: Kevin M. Lepak, Austin, TX (US); William A. Hughes, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 70 days.

(21) Appl. No.: 14/274,603

(22) Filed: May 9, 2014

(65) Prior Publication Data

US 2015/0186276 A1 Jul. 2, 2015

Related U.S. Application Data

(60) Provisional application No. 61/922,794, filed on Dec. 31, 2013.

(51) Int. Cl.
G06F 12/08 (2006.01)

(52) U.S. Cl.
CPC ........ *G06F 12/0815* (2013.01); *G06F 12/0891* (2013.01)

(58) Field of Classification Search
CPC .......................... G06F 12/0815; G06F 12/0891
USPC .................................................. 711/118, 146
See application file for complete search history.

(56) References Cited

U.S. PATENT DOCUMENTS

| | | | |
|---|---|---|---|
| 6,857,051 B2 | 2/2005 | Sharma et al. | |
| 8,090,832 B1 | 1/2012 | Semke et al. | |
| 8,402,225 B2 | 3/2013 | Miller et al. | |
| 8,516,199 B2 | 8/2013 | Cypher et al. | |
| 2003/0212864 A1* | 11/2003 | Hicken et al. | 711/122 |
| 2004/0123028 A1* | 6/2004 | Kanai et al. | 711/113 |
| 2006/0004957 A1* | 1/2006 | Hand et al. | 711/113 |
| 2008/0307109 A1 | 12/2008 | Galloway et al. | |
| 2011/0191543 A1* | 8/2011 | Craske et al. | 711/131 |
| 2014/0101390 A1* | 4/2014 | Sohi et al. | 711/144 |

OTHER PUBLICATIONS

Alcaraz, Juan J. et al., "Combining ACK rate control and AQM to enhance TCP performance over 3G links," in Proceedings of the ACM international workshop on Performance monitoring, measurement, and evaluation of heterogeneous wireless and wired networks, pp. 56-63. ACM, 2006. Found via Google Scholar(URL: http://ait.upct.es/~jjalcaraz/pub/pm2 - r15.pdf).

Liu, Qinglong et al., "Mitigating the Impact of Asynchronous ACKs on the Performance of Opportunistic Network Coding," Published in: Global Communications Conference (GLOBECOM), 2012 IEEE. Date of Conference: Dec. 3-7, 2012. Found via Engineering Village and IEEE Xplore (URL: http://ieeexplore.ieee.org).

* cited by examiner

*Primary Examiner* — Than Nguyen
(74) *Attorney, Agent, or Firm* — Renaissance IP Law Group LLP

(57) ABSTRACT

According to one general aspect, a method of performing a cache transaction may include transmitting a cache request to a target device. The method may include receiving a cache response that is associated with the cache request. The method may further include completing the cache transaction without transmitting an exclusive cache response acknowledgement message to the target device.

19 Claims, 5 Drawing Sheets

100

300

REMOVAL AND OPTIMIZATION OF COHERENCE ACKNOWLEDGEMENT RESPONSES IN AN INTERCONNECT

CROSS-REFERENCE TO RELATED APPLICATION

This application claims priority under 35 U.S.C. §119 to Provisional Patent Application Ser. No. 61/922,794, entitled "REMOVAL AND OPTIMIZATION OF COHERENCE ACKNOWLEDGEMENT RESPONSES IN AN INTERCONNECT" filed on Dec. 31, 2013. The subject matter of this earlier filed application is hereby incorporated by reference.

TECHNICAL FIELD

This description relates to storing data, and more specifically to cache management.

BACKGROUND

In computing, the term "cache coherence" generally refers to the consistency of data stored in local caches of a shared resource, such as a main or system memory. Often when processors in a system maintain caches of a common memory resource, problems may arise with inconsistent data. This is often true of processors in a multiprocessing system. In a shared memory multiprocessor system with a separate cache memory for each processor, it is possible to have many copies of any one piece of data. For example, there may be one copy of the data in the main memory and one in each processor's cache memory. When one copy of the data is changed, the other copies of the data may be changed also. Cache coherence is the discipline that ensures that changes in the values of shared data are propagated throughout the system in a timely fashion.

In modern systems, a common problem is how to resolve coherence conflict ordering. For example, if two processors are attempting to access a piece of data, but one wishes to write the data and the other wants to read the data, the timing of the two actions determines what data is read. Often protocol-level methods of ordering are commonly implemented. Generally, to avoid deadlocks, interconnects normally implement a number of "virtual networks" or "virtual channels" for carrying different traffic classes (e.g., requests, snoops, responses, etc.) that must move independently to maintain.

Generally, a memory access or cache transaction involves three messages between the various devices, a request, a response, and an acknowledgment that the response was received. The acknowledgment message (ACK) generally informs the system that the cache transaction has completed and a second cache transaction to the same memory location (e.g., piece of data, etc.) may progress without cache coherency problems. However, these ACKs often result in a large number of small messages consuming system resources and time.

SUMMARY

According to one general aspect, a method of performing a cache transaction may include transmitting a cache request to a target device. The method may include receiving a cache response that is associated with the cache request. The method may further include completing the cache transaction without transmitting an exclusive cache response acknowledgement message to the target device.

According to another general aspect, an apparatus may include a request queue, a transaction queue manager, and an acknowledgement manager. The request queue may be configured to receive a cache request to a target device, wherein the cache request is comprises the beginning of a cache transaction. The transaction queue manager may be configured to transmit the cache request to a target device, and receive a cache response that is associated with the cache request. The acknowledgement manager may be configured to complete the cache transaction without transmitting an exclusive cache response acknowledgement message to the target device.

According to another general aspect, a computer program product for performing a cache transaction may be tangibly embodied on a computer-readable medium. The computer program product may include executable code that, when executed, is configured to cause a data processing apparatus to transmit a cache request to a target device. The executable code, when executed, may be configured to cause a data processing apparatus to receive a cache response that is associated with the cache request. The executable code, when executed, may be configured to cause a data processing apparatus to complete the cache transaction without transmitting an exclusive cache response acknowledgement message to the target device.

The details of one or more implementations are set forth in the accompanying drawings and the description below. Other features will be apparent from the description and drawings, and from the claims.

A system and/or method for storing data, and more specifically to cache management, substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Figure 1:
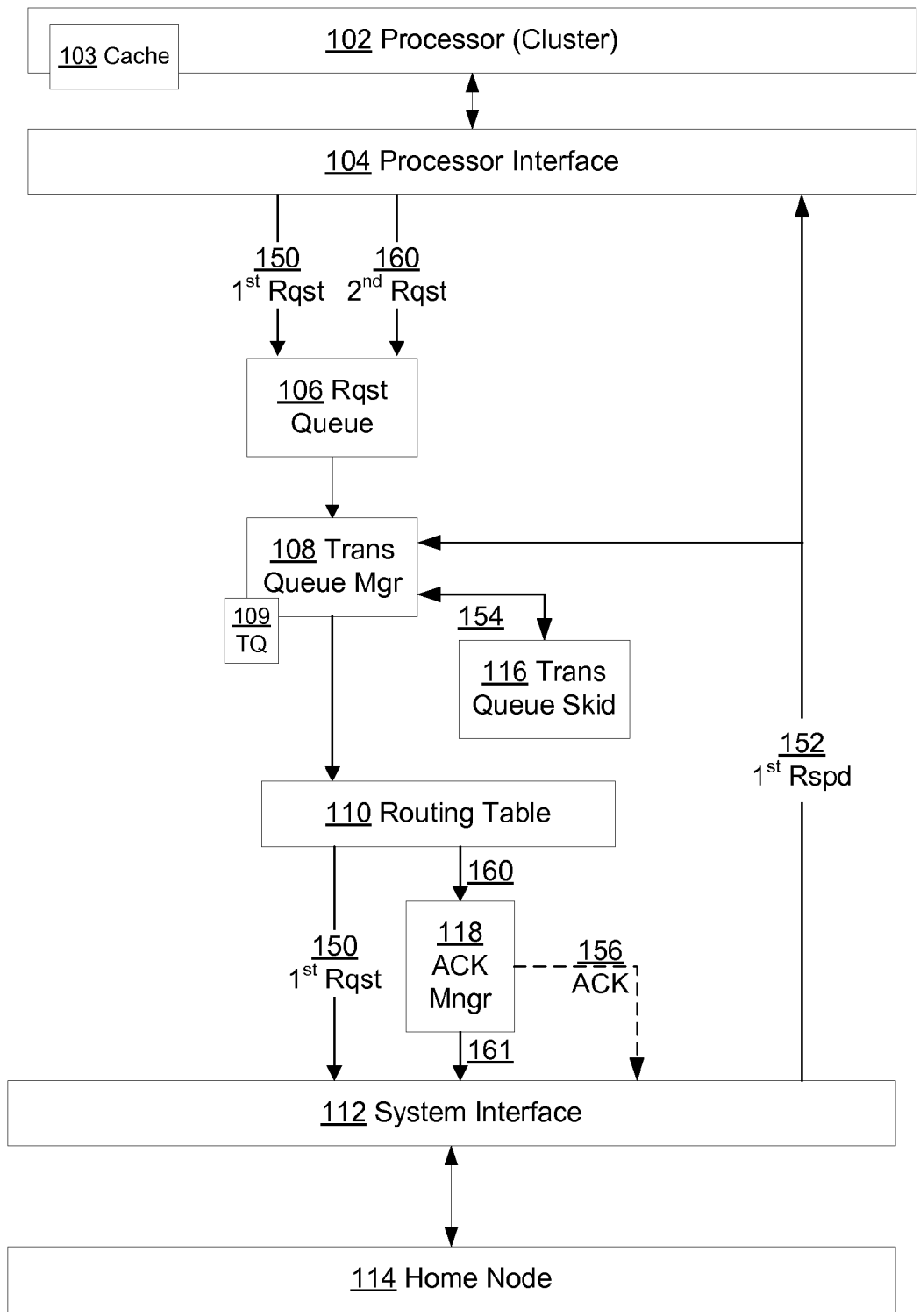
FIG. 1 is a block diagram of an example embodiment of a system in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

As described above, acknowledgement messages (ACKs) are often critical in modern cache coherence schemes in assuring that the timing of cache transactions occur in a regulated manner, such that processors or other logic devices are performing tasks using correct or accurate data. To demonstrate the value of these ACKs an example is given below.

In one embodiment, a cache coherence network may be created with three virtual channels: Request, Snoop, and Response. A common cache transaction that is resolved with ACKs is a cache line allocate (from a first processor) that is followed by another cache line invalidate/allocate (by a different processor). In such an embodiment, the first processor's cache transaction may occur first and the cache line allocation request may generate a snoop and response from the memory manager or memory controller. When the snoop and response have occurred and the final response has been delivered to first processor, the first processor may generate an ACK message back to the memory controller. This ACK may indicate that the cache line allocation request transaction is complete and that any other cache transaction involving the same memory address may proceed. In such an embodiment, all three messages (snoop, response, and ACK) may travel via different virtual channels so ordering may not be enforced between them within the interconnect mechanism between the devices (e.g., first processor, second processor, memory controller, etc.).

The second processor's cache transaction (e.g., a cache line invalidate, etc.) may reach the memory controller next and the cache line invalidate request may be blocked by address-matching logic at the memory controller while the first cache transaction (e.g., from the first processor, etc.) is being processed. Once the first cache transaction is complete (signified by the ACK from first processor being received at the memory controller), the second request may be allowed to proceed. In such an embodiment, the ACK may serve as a mechanism to assuring the cache line is not invalidated before it is fully allocated.

Further, to understand the importance of the ACK, consider the case where the second cache transaction does not wait for the ACK from the first cache transaction. The snoop request generated as part of the second cache transaction may be generated after the data response to the first cache transaction at the memory controller. However, since the response (to the first request) and the snoops (for the second request) travel in different virtual channels they may pass one-another. The snoops for the second request may require the data from the first cache transaction (e.g., if it was delivered in Modified or UniqueDirty state and was to be written by the first CPU, etc.) and thus snoops for the second cache transaction passing the response for the first cache transaction may lead to errors in protocol processing, etc. This may be solved by delaying the start of the actions for the second cache transaction until the first cache transaction is complete (as signified by the ACK from the first cache transaction being received at the memory controller).

This illustrates the importance of the ACK. However, in many cases (e.g., no coherence conflicts, etc.) the ACKs may contribute a large number of "small" messages that travel on the interconnection network and provide little value. In some networks, it may be difficult to carry many small packets efficiently. The disclosed subject matter illustrates embodiments in which at least some of these ACKs may be removed completely, or, may be combined with other messages. In various embodiments, techniques involving the disclosed subject matter may improve the interconnect efficiency and allow for a lower bandwidth interconnect or higher level of protocol-limited performance on an existing interconnect. It is understood that the above are merely a few illustrative examples to which the disclosed subject matter is not limited.

FIG. 1 is a block diagram of an example embodiment of a system 100 in accordance with the disclosed subject matter. In the illustrated embodiment, the system 100 may illustrate an embodiment of the disclosed subject matter in which acknowledgment messages (ACKs) may be combined with other non-ACK messages. In such an embodiment, the number of individual messages transmitted across the system 100 may be reduced.

In the illustrated embodiment, the system 100 may represent part of a larger system or device. In such an embodiment, a cluster or plurality of processors (e.g., central processor units (CPUs), graphic processor units (GPUs), etc.) may each access various pieces of data ultimately stored in a central or system memory. Each of these processors may employ a cache to temporarily store respective versions of a sub-set of the pieces of data. As such, the system 100 may employ a cache coherence protocol or mechanism to assure or attempt to assure that the processors only make use of valid data.

In the illustrated embodiment, the system 100 may include a processor interface 104, a request queue 106, a transaction queue manager 108, a transaction queue skid 116, a routing table 110, an ACK manager 118, and/or a system interface 112. In various embodiments, the system 100 may include a home node 114 or other target device. It is understood that the above are merely a few illustrative examples to which the disclosed subject matter is not limited.

In one embodiment, the system 100 may include one or more processors 102 configured to perform operations upon data stored in their respective caches. When a processor 102 wishes to perform an action or operation involving the data in the respective cache 103, the processor 102 may initiate a cache transaction (e.g., read, write, allocate, snoop, etc.). In various embodiments, the cache transaction may include three basic portions or messages: a request to perform the cache action, a response to the request, and an acknowledgment (ACK) that the processor considers the cache transaction to be complete. In various embodiments, the cache transaction may include more messages or actions, but for the sake of illustration a cache transaction will be described as including these three portions. It is understood that the above is merely one illustrative example to which the disclosed subject matter is not limited.

In the illustrated embodiment, the processor 102 may initiate or start the cache transaction by transmitting a cache request message 150 to a target device. In various embodiments, the target device may include another processor 102, a memory controller, or a home node 114, etc. In various embodiments that employ a directory caching protocol, the initiating processor 102 may be referred to as a local node. Another processor 102 that includes a copy of the data associated with the cache transaction may be referred to as a remote node. In addition, the memory in which the data is ultimately stored may be referred to as the home node 114. It is understood that the above is merely one illustrative example to which the disclosed subject matter is not limited.

In the illustrated embodiment, the system 100 may include a processor interface 104 configured to facilitate communication between the processor 102 and other devices associated with the cache. The cache request message 150 may travel through this processor interface 104, and be placed within a request queue 106. In various embodiments, the request queue 106 may be configured to order various cache request messages 150.

In the illustrated embodiment, when the cache request 150 is transmitted to the home node 114 (or other device, etc.), the cache request 150 may be de-allocated from the request queue 106. The cache request 150 may be entered into the transaction queue (TQ) 109. In various embodiments, the transaction queue 109 may be configured to keep track of various in-process cache transactions and their respective statuses. In some embodiments, the transaction queue 109 may include a scoreboard or other tracking data structure. In some embodiments, the transaction queue 109 may be managed by the transaction queue manager 108.

Further, in the illustrated embodiment, the cache request 150 may pass through or be aided by the routing table 110. In various embodiments, the route table 110 may be configured to provide routing information regarding one or more devices (e.g., the cluster of processors 102, the home node 114, etc.). In such an embodiment, using the routing table 110 the address of the target device (which in the illustrated embodiment is the home node 114) may be determined. Once the address of the target device is determined (and added to the cache request 150), the cache request 150 may pass through the system interface 112, and be transmitted to the target device (e.g., the home node 114).

In response to that action, the target device (e.g., the home node 114), may send snoop requests (if not filtered by a directory), receive snoop responses, and may transmit back to the source device (e.g., the processor 102, etc) a cache response message 152. In response to that action, the target device (e.g., the home node 114), may transmit back to the source device (e.g., the processor 102, etc.) a cache response message 152. In various embodiments, the cache response 152 may depend upon the type of cache request 150. For example, a read request may result in a cache response 152 that includes the data stored at the memory location associated with the read request. A write request may result in a cache response that includes an indication that the write was successful. It is understood that the above are merely a few illustrative examples to which the disclosed subject matter is not limited.

In the illustrated embodiment, as the cache response 152 is being communicated from the target device (e.g., the home node 114, etc.) to the source device (e.g., processor 102, etc.), the cache response 152 may also be observed or received by the transaction queue manager 108.

In various embodiments, in reaction to the cache response 152, the transaction queue manager 108 may generate an ACK 154 in order to close or end the cache transaction started by the cache request 150. In the illustrated embodiment, instead of the ACK 154 being transmitted directly to the target node (e.g., home node 114, etc.), the ACK 154 may be entered into the transaction queue skid 116. In various embodiments, the transaction queue skid 116 may be configured to hold or store messages (e.g., the ACK 154, etc.) generated by the transaction queue manager 108.

In the illustrated embodiment, the system 100 may be configured to opportunistically complete a cache transaction without sending an exclusive ACK 156. In one such embodiment, the transaction queue manager 108 may be configured to issue the ACK 154 towards the target device. However, that ACK 154 may be captured by the ACK manager 118 prior to its transmittal to the target device (e.g., home node 114, etc.).

In such an embodiment, the ACK manager 118 may be configured to store the ACK 154 after it has passed through the routing table 110.

In such an embodiment, the ACK manager 118 may be configured to wait until a second cache request 160 is to be transmitted to the same target device (e.g., home node 114, etc.). In various embodiments, the source device or another device (e.g., a processor 102, etc.) may initiate a second cache transaction. As described above, as part of this second cache transaction, a second cache request 160 (roughly similar to cache request 150) may be transmitted to the target device. At which time, the ACK manager 118 may be configured to embed the ACK 154 within the second cache request, a combined cache request 161. Therefore, the first cache transaction may be completed (via the ACK 154 being embedded in the combined cache request 161) but no exclusive ACK message 156 needs to be transmitted to the target device. In such an embodiment, the system 100 may reduce the number of messages transmitted by one (as the second cache request and the ACK 154 may be combined into a single message, combine cache request 161).

In some embodiments, such as, for example, a traditional system with virtual-network or virtual-channel flow control, combining ACK responses with Requests may not be acceptable within the bounds of the protocol employed. For example, the protocol may not allow combining traffic from different virtual channels because it may create deadlocks. However, in another embodiment that includes networks with end-to-end flow control this combining may be done because the transport mechanism may not need to maintain virtual-network independent channels. It is understood that the above are merely a few illustrative examples to which the disclosed subject matter is not limited.

In one embodiment, the ACK manager 118 may wait until a second cache request 160 occurs. In various embodiments, the ACK manager 118 may then determine if the second cache request's target device is the same target device as the ACK 154. In some embodiments, the two target devices may not be the same. In that case, the ACK 154 may not be embedded into the second cache request 160, as the second cache request 160 is not being transmitted to the proper destination.

However, in various embodiments, if the second cache request 160 and the ACK 154 share the same target device, the ACK manager 118 may be configured to determine if the second cache request 160 includes a number of superfluous bits equal or greater to the size of the ACK 154 or a portion thereof. For example, as described below, some cache request messages (e.g., a ReadShared, etc.) may include fields or bits that are not needed but are required by the protocol. In such an embodiment, these bits or fields may be replaced by the ACK 154.

Figure 2:
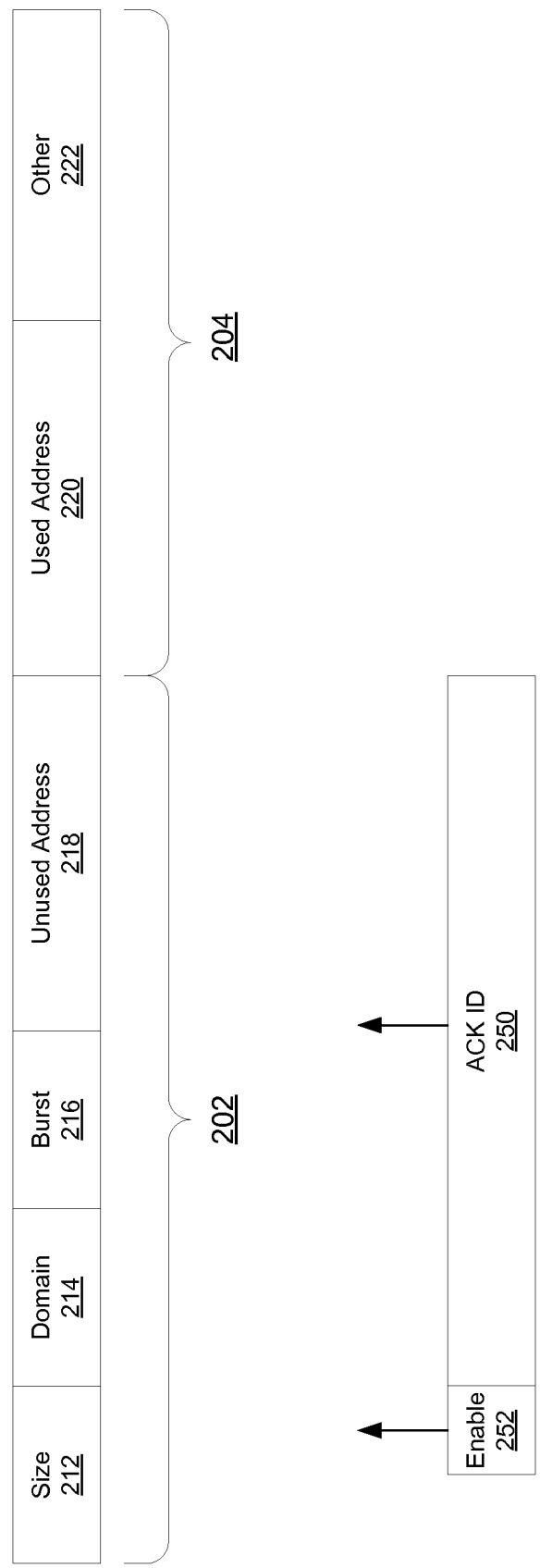
FIG. 2 is a diagram of an example embodiment of a data structure in accordance with the disclosed subject matter.

A specific example may be illustrated by FIG. 2. FIG. 2 is a diagram of an example embodiment of a data structure 200 in accordance with the disclosed subject matter. In the illustrated embodiment, the data structure 200 may include a specific non-limiting example that shows a ReadShared cache request. In various embodiments, the ReadShared cache request may include a read cache transaction directed towards a region of memory that may be shared with other devices. It is understood that the above is merely one illustrative example to which the disclosed subject matter is not limited.

In such an embodiment, the overall data structure of the cache request may be dictated by the protocol employed. However, for certain commands or cache requests (e.g., the illustrated ReadShared, etc.) portions of the data structure may be superfluous or unneeded. In the illustrated embodiment, the data structure 200 may include a superfluous portion 202 and a non-superfluous portion 204.

In one specific embodiment, the superfluous portion 202 may include a Size field 212 that includes 3 bits, but may be unneeded for the ReadShared command as a full cache line may be assumed. In the illustrated embodiment, the superfluous portion 202 may include a Domain field 214 that includes 2 bits, but may be unneeded for the ReadShared command as it may be assumed that all such cache requests are inner-sharable. In various embodiments, the superfluous portion 202 may include a Burst type field 216 that includes 2 bits, but may be unneeded for the ReadShared command as it may be assumed that all such cache requests make use of a specific predetermined burst type (e.g., the "WRAP" burst type in which memory addresses wrap around if unaligned, etc.). In the illustrated embodiment, the superfluous portion 202 may include a portion of a larger address field, the unused address field 218. In various embodiments, the unused address field 218 may include 4 bits that include the least significant bits (LSBs) of the memory address. However, in such an embodiment, these bits may be unneeded for the ReadShared command as a full cache line may be assumed. It is understood that the above are merely a few illustrative examples to which the disclosed subject matter is not limited.

Conversely, in the illustrated embodiment, the non-superfluous portion 204 may include the rest of the larger address field (the used address portion 220), and various other information 222. These fields included by the non-superfluous portion 204 may be deemed necessary for the proper completion of the cache request.

As described above, in various embodiments, the superfluous portion 202 of the second cache request may be replaced by an ACK message associated with a first cache request. In one embodiment, the ACK message may include a substantially unique identifier (ACK ID) 250 that identifies the first cache request or first cache transaction. In such an embodiment, this ACK ID 250 may include 8 bits, and may therefore be able to replace 8 of the 12 superfluous bits of the superfluous portion 202. In various embodiments, the superfluous portion 202 may also be modified to include enable/disable bits 252 that signify whether an ACK is combined in the current request, etc. It is understood that the above is merely one illustrative example to which the disclosed subject matter is not limited.

Returning to FIG. 1, in one embodiment, the ACK manager 118 may be configured to generate a combined cache request 161, as opposed to an exclusive ACK 156, during predefined situations. In one such embodiment, the ACK 154 may be embedded within a combined cache request 161 if the second cache request 160 includes a cache line-only cache request. It is understood that the above is merely one illustrative example to which the disclosed subject matter is not limited.

In various embodiments, some second cache requests 160 may not include enough superfluous bits for the ACK 154 to be embedded within the second cache request 160. For example, distributed virtual memory (DVM) operations or cache transactions require all of the bits in the cache request 160 and in such cases, the ACK manager 118 may be configured to not combine the ACK 154 with the second cache request 160. In various embodiments, the ACK Manager 118 may be configured to not attempt the formation of a combined cache request 161 based upon a list of predefined cache request types (e.g., ReadNoSnoop, DVM cache requests, etc.).

In another embodiment, the protocol employed to communicate with a target device may include an ACK 154 that includes a relatively large amount of information or bits. In such an embodiment, embedding the ACK 154 within a second cache request 160 may be prohibitive (e.g., the number of superfluous bits may be too low, etc.). In such an embodiment, the ACK manager 118 may be configured to be aware of the protocol employed to communicate between the source and target devices and combine or not combine ACKs 154 as appropriate.

In yet another embodiment, the ACK manager 118 may be configured to combine the ACK 154 and the second cache request 160 if the two occur within a predefined amount of time. In such an embodiment, if the period between the two is greater than a timeout period, the ACK manager 118 may be configured to close the first cache transaction even if no second cache request 160 has occurred (and therefore the possibility of combining the ACK 154 has not occurred).

In even one more embodiment, the ACK manager 118 may be configured to be aware of the loading or amount of traffic on the cache network. In such an embodiment, the ACK manager 118 may be configured to opt to not generate a combined cache request 161 or complete the first cache transaction if the amount of traffic is below a threshold amount. In various embodiments, when the network traffic is sufficiently low that the addition of an exclusive ACK 156 may be negligible, an exclusive ACK 156 may be used to complete the first cache transaction. Conversely, in a situation in which network traffic is high, the chance that a suitable cache request for combining may occur or be available may be high, and the ACK manager 118 may opt to wait for such a suitable cache request. It is understood that the above are merely a few illustrative examples to which the disclosed subject matter is not limited.

In the illustrated embodiment, the combined cache request 161, with the embedded ACK 154, may serve to complete first cache transaction. In such an embodiment, the combined cache request 161 may reduce the amount of traffic on the cache network and may do so without an increase in the amount of signals included by the command bus or network. In various embodiments, the disclosed subject matter may be employed in either a snooping or directory-based cache protocol. It is understood that the above are merely a few illustrative examples to which the disclosed subject matter is not limited.

However, in various embodiments, if the ACK manager 118 does not generate a combined cache request 161, the ACK manager 118 may be configured to generate and transmit an exclusive ACK 156 to the target device (e.g., home node 114, etc.). In such an embodiment, the first cache transaction may be completed using an exclusive ACK 156. In various embodiments, this exclusive ACK 156 may be more akin to traditional schemes for closing the cache transaction, as described above. It is understood that the above is merely one illustrative example to which the disclosed subject matter is not limited.

In various embodiments, the ACK manager 118 may be included as part of the transaction queue manager 108. In some embodiments, the ACK manager 118 may include a memory or buffer configured to store the ACKs 154 until a corresponding cache request 160 is available for combining. It is understood that the above is merely one illustrative example to which the disclosed subject matter is not limited.

Figure 3:
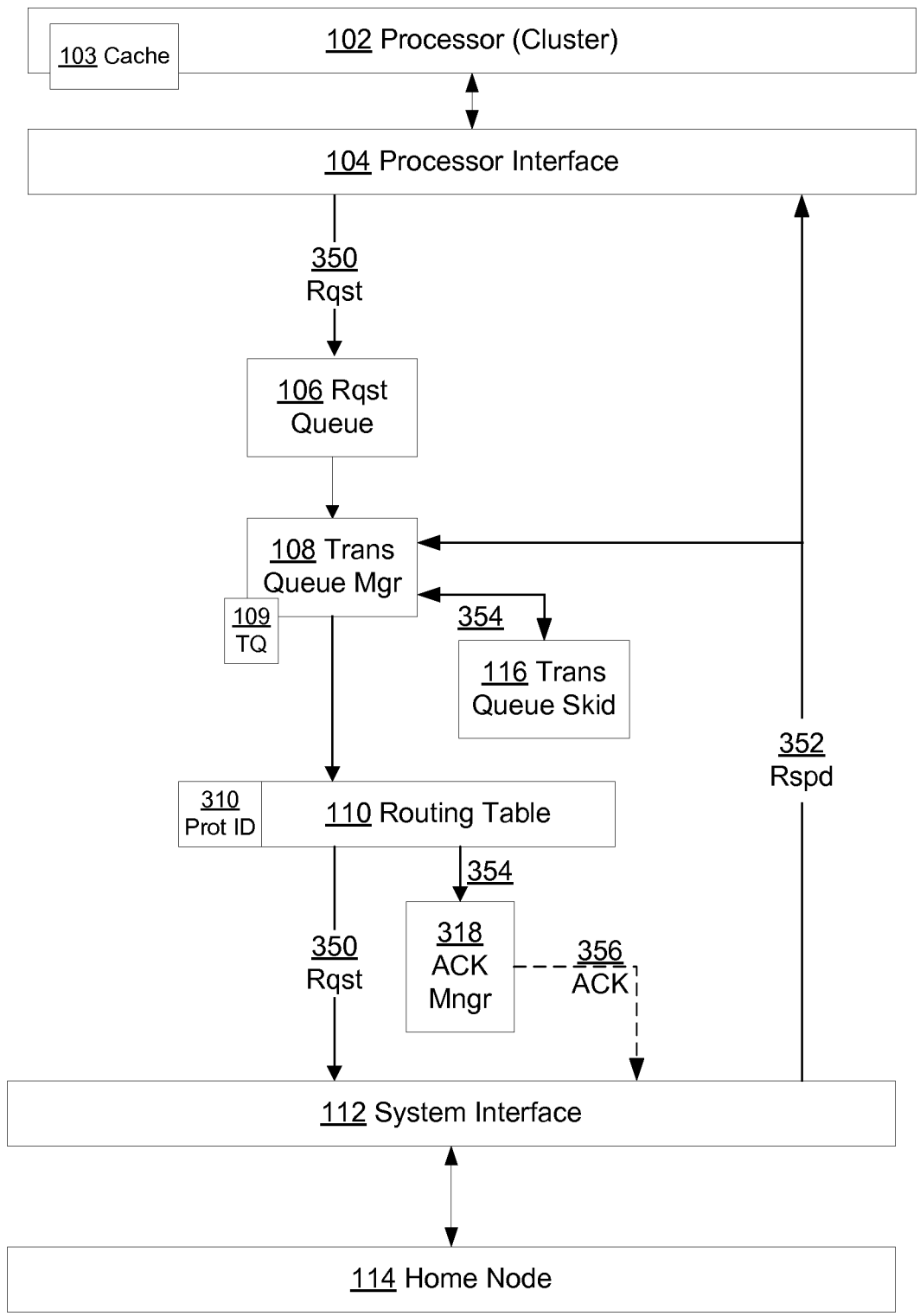
FIG. 3 is a block diagram of an example embodiment of a system in accordance with the disclosed subject matter.

FIG. 3 is a block diagram of an example embodiment of a system 300 in accordance with the disclosed subject matter. In the illustrated embodiment, the system 300 may illustrate an embodiment of the disclosed subject matter in which acknowledgment messages (ACKs) may not be used to complete a cache transaction. In such an embodiment, the number of individual messages transmitted across the system 300 may be reduced.

In the illustrated embodiment, the system 300 may include a processor interface 104, a request queue 106, a transaction queue manager 108, a transaction queue skid 116, a routing table 110, an ACK manager 118, and/or a system interface 112. In various embodiments, the system 300 may include a home node 114 or other target device. It is understood that the above are merely a few illustrative examples to which the disclosed subject matter is not limited.

In the illustrated embodiment, the processor 102 may initiate or start a cache transaction, similarly to that described above. In various embodiments, as part of that initiation, a cache request 350 may be received by the request queue 106, as described above. As described above, the cache request 350 may be received by the transaction queue manager 108 and entered into the transaction queue 109. The routing table 110 may be employed to determine the address of the target device (e.g., the home node 114, etc.) associated with the cache request 350. The cache request 350 may then be transmitted to the target device (e.g., home node 114, etc.).

As described above, in various embodiments, the cache request 350 may result in a cache response 352. In various embodiments, the cache response 352 may be observed or received by the transaction queue manager 108. In the illustrated embodiment, the transaction queue manager 108 may generate an ACK 354 and place the ACK in the transaction queue skid 116.

In the illustrated embodiment, the ACK manager 318 may receive the ACK 354. In this embodiment, the ACK manager 318 may be configured to remove or delete the ACK 354 based upon a predefined set of criteria. In the illustrated embodiment, some ACKs 354 may not be necessary to complete or close the cache transaction and therefore an exclusive ACK 356 may be removed or not transmitted.

In various embodiments, certain types of cache transactions may not benefit from an exclusive ACK 356. For example, a ReadNoSnoop cache transaction may involve a read from a region of memory that is not shareable with other master devices (e.g., other processors 102, etc.). In such an embodiment, as the memory is not shareable, external ordering control may not be needed (as the processor 102 may control the ordering, in various embodiments) and the use of an ACK 356 may be superfluous. In such an embodiment, the cache transactions, which might traditionally require an ACK 354, may be completed once the cache response 352 has been received, and no terminating exclusive ACK 356 may be transmitted. It is understood that the above is merely one illustrative example to which the disclosed subject matter is not limited.

In some embodiments, the classes of possible cache transactions that might traditionally require an exclusive ACK 356 may be divided into separate classes or types. In one specific embodiment, the classes or type of cache transactions may include Victim cache transactions, Write cache transactions, and/or Read cache transactions. It is understood that the above is merely one illustrative example to which the disclosed subject matter is not limited.

In various embodiments, the ACK manager 118 may be configured to treat each class or type of cache transaction differently. For example, a first class may include cache transactions in which an exclusive ACK 356 may provide little, if any, value, and therefore the cache transaction may be considered complete without the use of an exclusive ACK 356. Conversely, a second may include cache transactions in which an exclusive ACK 356 may provide a relatively high amount of value, and therefore the cache transaction may not be considered complete until an exclusive ACK 356 is transmitted. It is understood that the above are merely a few illustrative examples to which the disclosed subject matter is not limited.

In the specific embodiment referenced above, the class including the Victim cache transactions may include cache operations that remove a cache line from the cache (e.g., Evict cache transactions, WriteBack cache transactions, etc.). In one such embodiment, such transactions may employ snoop-match logic at the cache which does not allow responses until the target device (e.g., home node 114, etc.) responds. In various embodiments, this may ensure that the victim cache transaction is ordered ahead of a snoop cache transaction and may provide a resolution to the traditional snoop/victim race. In various embodiments, it may be possible to leverage the feature of the cache protocol that causes the cache to directly hold a snoop cache transaction off until a response for the victim cache transaction is received. In such an embodiment, having the target device wait for an exclusive ACK 356 may not contribute meaningfully to the ordering. In addition, various other forms of victim/request race resolution employed by various protocols may have a similar property in that the protocol may not require the ACK to carry any information about the 'final' state of the victim. It is understood that the above are merely a few illustrative examples to which the disclosed subject matter is not limited.

Continuing the specific embodiment referenced above, the class including the Write cache transactions may include cache operations that write data to or store data within a cache line (or portion thereof) of the cache (e.g., WriteLineUnique cache transactions, WriteUnique cache transactions, etc.). In various embodiments, a Write cache transaction may not include a cache allocation. In such an embodiment, the cache line may have already been allocated prior to the write cache transaction, or the cache line may not have been allocated and the entire data payload may be carried or included within the write cache request. In such an embodiment, the visibility of the data may be ensured by the target device (e.g., home node 114, etc.) itself. In such an embodiment, the protocol ordering provided by an exclusive ACK message 356 may not provide value. It is understood that the above is merely one illustrative example to which the disclosed subject matter is not limited.

Further continuing the specific embodiment referenced above, the class including the Read cache transactions may include cache operations that read data from a cache line (or portion thereof) of the cache (e.g., ReadUnique cache transactions, ReadShared cache transactions, etc.). In some embodiments, the exclusive ACK 356 may serve to prevent another cache transaction from disturbing the data that the Read operation is attempting to retrieve (e.g., via a write, cache line eviction, etc.). In various embodiments, the protocol ordering provided by an exclusive ACK message 356 may provide value, and the removal of the exclusive ACK 356 may not be desirable. It is understood that the above is merely one illustrative example to which the disclosed subject matter is not limited.

In various embodiments, the ACK manager 318 may be configured to generate or transmit exclusive ACKs 356 for certain predefined cache transaction types and not transmit exclusive ACKs 356 for other certain predefined cache transaction types. For example, in one embodiment, exclusive ACKs 356 may be transmitted for write and reads, but not victims. In another embodiment, exclusive ACKs 356 may be transmitted for reads, but not victims or writes. It is understood that the above are merely a few illustrative examples to which the disclosed subject matter is not limited.

In another embodiment, the system 100 may employ a variety of cache protocols. For example, the home node 114 may employ either/both a first and a second protocol, a first processor 102 may employ the first cache protocol, a second processor 102 may employ the second protocol, and a third processor 102 may employ the second protocol. In such an embodiment, the value of exclusive ACKs 356 may differ based upon cache protocol employed. In one such embodiment, the ACK manager 318 may be configured to remove or transmit exclusive ACKs 356 based upon the protocol associated with a specific cache transaction. In some embodiments, the ability to remove or not transmit an exclusive ACK 356 may be based, at least in part, upon the race resolution mechanisms employed by the protocols. It is understood that the above is merely one illustrative example to which the disclosed subject matter is not limited.

For example, if the cache transaction is between the first processor 102 and the home node 114 (i.e., using the first protocol), a first type of cache transactions may be completed without the transmittal of an exclusive ACK 356. Whereas, if the cache transaction is between the second or third processor 102 and the home node 114 (i.e., using the second protocol), a second type of cache transactions (or no cache transactions) may be completed without the transmittal of an exclusive ACK 356. In such an embodiment, different cache protocols may allow for different levels of efficiency due, in part, to the number of cache transactions that may be completed without the need for an exclusive ACK 356. It is understood that the above is merely one illustrative example to which the disclosed subject matter is not limited.

In various embodiments, a protocol identifier (ID) field 310 may be included in the routing table 110. In such an embodiment, the protocol ID field 310 may be used by the ACK manager 318 to determine which protocol the source and target devices are using, and if, under the rules established for that protocol, an exclusive ACK 356 is to be transmitted or not. For example, in one embodiment, the protocol ID field 310 may indicate that communication between two devices involves a standard or basic cache coherency protocol, that limits the number of opportunities to remove or not transmit exclusive ACKs 356. But, in such an embodiment, the protocol ID field 310 may indicate that communication between two other devices may involve an enhanced or performance version of the cache coherency protocol, and this protocol allows more opportunities to remove or not transmit exclusive ACKs 356. It is understood that the above is merely one illustrative example to which the disclosed subject matter is not limited.

Figure 4:
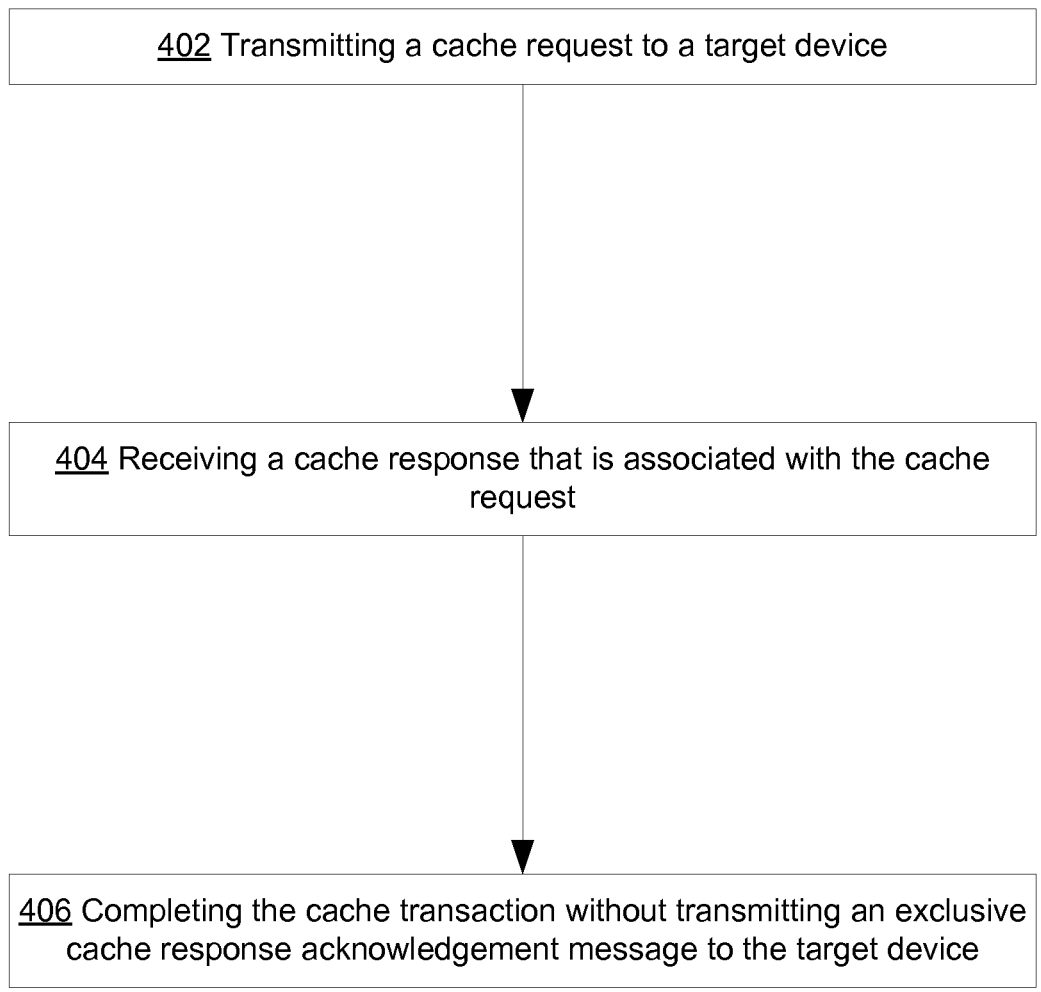
FIG. 4 is a flowchart of an example embodiment of a technique in accordance with the disclosed subject matter.

FIG. 4 is a flow chart of an example embodiment of a technique in accordance with the disclosed subject matter. In various embodiments, the technique 400 may be used or produced by the systems such as those of FIG. 1, 3, or 5. Furthermore, portions of technique 400 may be used with or produce data structures such as that of FIG. 2. Although, it is understood that the above are merely a few illustrative examples to which the disclosed subject matter is not limited. It is understood that the disclosed subject matter is not limited to the ordering of or number of actions illustrated by technique 400.

Block 402 illustrates that, in one embodiment, a cache request may be transmitted to a target device, as described above. In various embodiments, one or more of the action(s) illustrated by this Block may be performed by the apparatuses or systems of FIG. 1 or 2, the request queue of FIG. 1 or 2, as described above.

Block 404 illustrates that, in one embodiment, a cache response may be received that is associated with the cache request, as described above. In various embodiments, one or more of the action(s) illustrated by this Block may be performed by the apparatuses or systems of FIG. 1 or 2, the transaction queue manager of FIG. 1 or 2, as described above.

Block 406 illustrates that, in one embodiment, the cache transaction may be completed without transmitting an exclusive cache response acknowledgement message to the target device, as described above. In one embodiment, completing may include embedding a cache response acknowledgement within a second cache request to the target device, as described above. In such an embodiment, embedding a cache response acknowledgement within a second cache request may include determining if the second cache request comprises a number of superfluous bits at least equal to a size of a cache response acknowledgement associated with the cache response, and setting at least a portion of the superfluous bits equal to the cache response acknowledgement, as described above. In one such embodiment, determining if the second cache request comprises a number of superfluous bits at least equal to a size of a cache response acknowledgement may include determining if the second cache request comprises a cache-line-only cacheable request, as described above. In another embodiment, the cache response acknowledgement may include an identifier associated with the cache request, as described above.

In one embodiment, the cache request may include a victim cache request, as described above. In such an embodiment, the technique 400 may further include preparing to transmit a snoop cache request to the target device, as described above. In one such embodiment, completing the cache transaction may include delaying the transmittal of the snoop cache request until the cache response that is associated with the victim cache request has been received, as described above.

In another embodiment, the cache request to the target device may include a write cache request associated with a cache line, as described above. In such an embodiment, completing the cache transaction may include completing the cache transaction without transmitting an exclusive cache response acknowledgement message, if the cache line was not allocated prior to the write cache request, as described above.

In yet another embodiment, the cache request to the target device may include a read cache request, as described above. In such an embodiment, the technique 400 may further include determining if communication with the target device employs either a first protocol or a second protocol, as described above. In such an embodiment, if the communication with the target device employs the first protocol, the technique 400 may further include completing the cache transaction by transmitting an exclusive cache response acknowledgement message to the target device, as described above. In one such embodiment, completing the cache transaction without transmitting an exclusive cache response acknowledgement message may include completing the cache transaction without transmitting an exclusive cache response acknowledgement message, if the communication with the target device employs the second protocol, as described above.

It is understood that the above are merely a few illustrative examples to which the disclosed subject matter is not limited. In various embodiments, one or more of the action(s) illustrated by this Block may be performed by the apparatuses or systems of FIG. 1 or 2, the transaction queue manager of FIG. 1 or 2, as described above.

Figure 5:
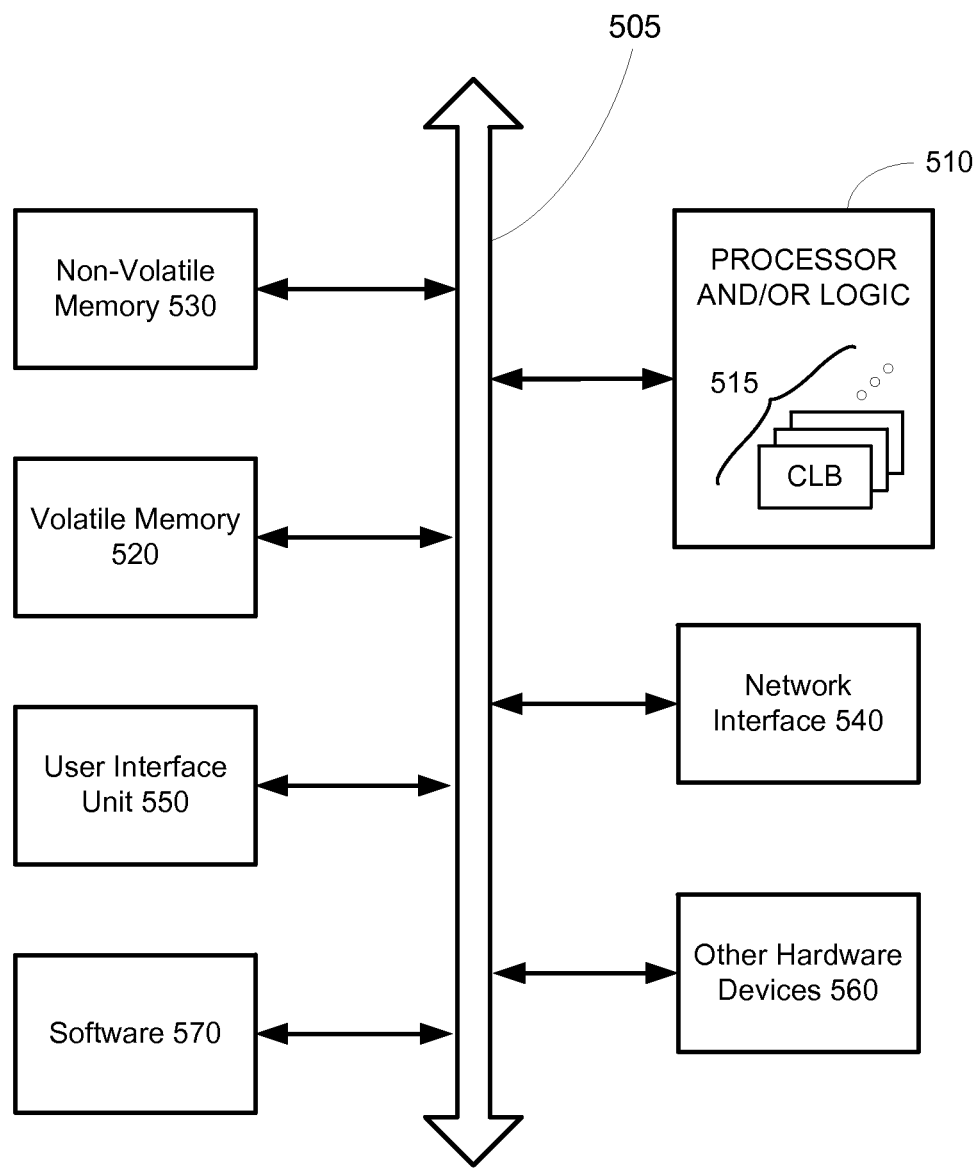
FIG. 5 is a schematic block diagram of an information processing system that may include devices formed according to principles of the disclosed subject matter.

FIG. 5 is a schematic block diagram of an information processing system 500, which may include semiconductor devices formed according to principles of the disclosed subject matter.

Referring to FIG. 5, an information processing system 500 may include one or more of devices constructed according to the principles of the disclosed subject matter. In another embodiment, the information processing system 500 may employ or execute one or more techniques according to the principles of the disclosed subject matter.

In various embodiments, the information processing system 500 may include a computing device, such as, for example, a laptop, desktop, workstation, server, blade server, personal digital assistant, smartphone, tablet, and other appropriate computers, etc. or a virtual machine or virtual computing device thereof. In various embodiments, the information processing system 500 may be used by a user (not shown).

The information processing system 500 according to the disclosed subject matter may further include a central processing unit (CPU), logic, or processor 510. In some embodiments, the processor 510 may include one or more functional unit blocks (FUBs) or combinational logic blocks (CLBs) 515. In such an embodiment, a combinational logic block may include various Boolean logic operations (e.g., NAND, NOR, NOT, XOR, etc.), stabilizing logic devices (e.g., flip-flops, latches, etc.), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 500 according to the disclosed subject matter may further include a volatile memory 520 (e.g., a Random Access Memory (RAM), etc.). The information processing system 500 according to the disclosed subject matter may further include a non-volatile memory 530 (e.g., a hard drive, an optical memory, a NAND or Flash memory, etc.). In some embodiments, either the volatile memory 520, the non-volatile memory 530, or a combination or portions thereof may be referred to as a "storage medium". In various embodiments, the volatile memory 520 and/or the non-volatile memory 530 may be configured to store data in a semi-permanent or substantially permanent form.

In various embodiments, the information processing system 500 may include one or more network interfaces 540 configured to allow the information processing system 500 to be part of and communicate via a communications network. Examples of a Wi-Fi protocol may include, but are not limited to, Institute of Electrical and Electronics Engineers (IEEE) 802.11g, IEEE 802.11n, etc. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), etc. Examples of a wired protocol may include, but are not limited to, IEEE 802.3 (a.k.a. Ethernet), Fibre Channel, Power Line communication (e.g., HomePlug, IEEE 1901, etc.), etc. It is understood that the above are merely a few illustrative examples to which the disclosed subject matter is not limited.

The information processing system 500 according to the disclosed subject matter may further include a user interface unit 550 (e.g., a display adapter, a haptic interface, a human interface device, etc.). In various embodiments, this user interface unit 550 may be configured to either receive input from a user and/or provide output to a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

In various embodiments, the information processing system 500 may include one or more other devices or hardware components 560 (e.g., a display or monitor, a keyboard, a mouse, a camera, a fingerprint reader, a video processor, etc.). It is understood that the above are merely a few illustrative examples to which the disclosed subject matter is not limited.

The information processing system 500 according to the disclosed subject matter may further include one or more system buses 505. In such an embodiment, the system bus 505 may be configured to communicatively couple the processor 510, the volatile memory 520, the non-volatile memory 530, the network interface 540, the user interface unit 550, and one or more hardware components 560. Data processed by the processor 510 or data inputted from outside of the non-volatile memory 530 may be stored in either the non-volatile memory 530 or the volatile memory 520.

In various embodiments, the information processing system 500 may include or execute one or more software components 570. In some embodiments, the software components 570 may include an operating system (OS) and/or an application. In some embodiments, the OS may be configured to provide one or more services to an application and manage or act as an intermediary between the application and the various hardware components (e.g., the processor 510, a network interface 540, etc.) of the information processing system 500. In such an embodiment, the information processing system 500 may include one or more native applications, which may be installed locally (e.g., within the non-volatile memory 530, etc.) and configured to be executed directly by the processor 510 and directly interact with the OS. In such an embodiment, the native applications may include pre-compiled machine executable code. In some embodiments, the native applications may include a script interpreter (e.g., C shell (csh), AppleScript, AutoHotkey, etc.) or a virtual execution machine (VM) (e.g., the Java Virtual Machine, the Microsoft Common Language Runtime, etc.) that are configured to translate source or object code into executable code which is then executed by the processor 510.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (S SOP) technique, a thin small outline package (TS OP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive, etc.). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. A method of performing a cache transaction comprising:
   transmitting a cache request to a target device;
   receiving a cache response that is associated with the cache request; and
   completing the cache transaction by, based at least in part upon a type associated with the cache request, embedding a cache response acknowledgement within a second cache request to the target device, and without transmitting an exclusive cache response acknowledgement message to the target device.

2. The method of claim 1, wherein embedding a cache response acknowledgement within a second cache request comprises:
   determining if the second cache request comprises a number of superfluous bits at least equal to a size of a cache response acknowledgement associated with the cache response; and
   setting at least a portion of the superfluous bits equal to the cache response acknowledgement.

3. The method of claim 2, wherein determining if the second cache request comprises a number of superfluous bits at least equal to a size of a cache response acknowledgement comprises:
   determining if the second cache request comprises a cache-line-only cacheable request.

4. The method of claim 2, wherein the cache response acknowledgement includes an identifier associated with the cache request.

5. The method of claim 1, wherein the cache request comprises a victim cache request;
further comprising preparing to transmit a snoop cache request to the target device; and
wherein completing the cache transaction comprises delaying the transmittal of the snoop cache request until the cache response that is associated with the victim cache request has been received.

6. The method of claim 1, wherein the cache request to the target device comprises a write cache request associated with a cache line; and
wherein completing the cache transaction comprises completing the cache transaction without transmitting an exclusive cache response acknowledgement message, if the cache line was not allocated prior to the write cache request.

7. The method of claim 1, wherein the cache request to the target device comprises a write cache request associated with a cache line; and
wherein completing the cache transaction comprises completing the cache transaction without transmitting an exclusive cache response acknowledgement message, if the cache line was allocated prior to the write cache request.

8. The method of claim 1, wherein the cache request to the target device comprises a read cache request;
further comprising:
determining if communication with the target device employs either a first protocol or a second protocol, and
if the communication with the target device employs the first protocol, completing the cache transaction by transmitting an exclusive cache response acknowledgement message to the target device; and
wherein completing the cache transaction without transmitting an exclusive cache response acknowledgement message comprises completing the cache transaction without transmitting an exclusive cache response acknowledgement message, if the communication with the target device employs the second protocol.

9. An apparatus comprising:
a request queue configured to:
receive a cache request to a target device, wherein the cache request comprises a beginning of a cache transaction;
a transaction queue manager configured to:
transmit the cache request to a target device, and
receive a cache response that is associated with the cache request; and
an acknowledgement manager configured to, depending at least in part upon a type associated with the cache request,
embed a cache response acknowledgement within a second cache request to the target device, and
complete the cache transaction without transmitting an exclusive cache response acknowledgement message to the target device.

10. The apparatus of claim 9, wherein the acknowledgement manager is configured to:
determine if the second cache request comprises a number of superfluous bits at least equal to a size of a cache response acknowledgement associated with the cache response; and
set at least a portion of the superfluous bits equal to the cache response acknowledgement.

11. The apparatus of claim 9, wherein the acknowledgement manager is configured to:
determine if the second cache request comprises a cache-line-only cacheable request.

12. The apparatus of claim 9, wherein the cache response acknowledgement includes an identifier associated with the cache request.

13. The apparatus of claim 9, wherein the cache request comprises a victim cache request; and
wherein the acknowledgement manager is configured to:
delay the transmittal of a snoop cache request, associated with the victim cache request, until the cache response that is associated with the victim cache request has been received.

14. The apparatus of claim 9, wherein the cache request comprises a write cache request associated with a cache line; and
wherein the acknowledgement manager is configured to:
complete the cache transaction without transmitting an exclusive cache response acknowledgement message only if the cache line was allocated prior to the write cache request.

15. The apparatus of claim 9, wherein the cache request to the target device comprises a read cache request; and
wherein the acknowledgement manager is configured to:
determine if communication with the target device employs either a first protocol or a second protocol,
if the communication with the target device employs the first protocol, complete the cache transaction by transmitting an exclusive cache response acknowledgement message to the target device, and
if the communication with the target device employs the second protocol, complete the cache transaction without transmitting an exclusive cache response acknowledgement message.

16. A computer program product for performing a cache transaction, the computer program product being tangibly embodied on a computer-readable medium and comprising executable code that, when executed, is configured to cause a data processing apparatus to:
transmit a cache request to a target device;
receive a cache response that is associated with the cache request; and
complete the cache transaction, depending at least in part upon a type associated with the cache request, embed a cache response acknowledgement within a second cache request to the target device, and without transmitting an exclusive cache response acknowledgement message to the target device.

17. The computer program product of claim 16, wherein the executable code that, when executed, is configured to cause the data processing apparatus to:
if the cache request is of a predefined type, complete the cache transaction by transmitting an exclusive cache response acknowledgement message to the target device.

18. The computer program product of claim 16, wherein the executable code that, when executed, is configured to cause the data processing apparatus to:
if the cache request to the target device comprises a write cache request associated with a cache line, and only if the cache line was not allocated prior to the write cache request,
complete the cache transaction without transmitting an exclusive cache response acknowledgement message.

19. The computer program product of claim 16, wherein the executable code that, when executed, is configured to cause the data processing apparatus to:
- determine if communication with the target device employs either a first protocol or a second protocol,
- if the communication with the target device employs the first protocol, complete the cache transaction by transmitting an exclusive cache response acknowledgement message to the target device, and
- if the communication with the target device employs the second protocol, complete the cache transaction without transmitting an exclusive cache response acknowledgement message.

* * * * *